(12) United States Patent
Inkrott et al.

(10) Patent No.: US 12,105,543 B2
(45) Date of Patent: Oct. 1, 2024

(54) METHODS FOR SAFELY RESTORING GAS FLOW TO A BUILDING FROM A REMOTE LOCATION AND RELATED SMART METERS

(71) Applicant: Sensus Spectrum, LLC, Morrisville, NC (US)

(72) Inventors: Benjamin Inkrott, Cary, NC (US); Christopher Wykle, Wake Forest, NC (US); Paul Honchar, DuBois, PA (US)

(73) Assignee: Sensus Spectrum, LLC, Dublin (IE)

( * ) Notice: Subject to any disclaimer, the term of this patent is extended or adjusted under 35 U.S.C. 154(b) by 506 days.

(21) Appl. No.: 17/533,399

(22) Filed: Nov. 23, 2021

(65) Prior Publication Data

US 2022/0171413 A1   Jun. 2, 2022

Related U.S. Application Data

(60) Provisional application No. 63/120,371, filed on Dec. 2, 2020.

(51) Int. Cl.
| | |
|---|---|
| *G05D 7/06* | (2006.01) |
| *G01F 15/00* | (2006.01) |
| *G01F 15/063* | (2022.01) |
| *G01M 3/28* | (2006.01) |
| *G01D 4/00* | (2006.01) |

(Continued)

(52) U.S. Cl.
CPC ......... *G05D 7/0635* (2013.01); *G01F 15/005* (2013.01); *G01F 15/063* (2013.01); *G01M 3/2815* (2013.01); *G01D 4/00* (2013.01); *G01D 18/00* (2013.01); *G01D 2204/26* (2021.05); *G01D 2218/10* (2021.05); *G01F 25/10* (2022.01); *Y02B 90/20* (2013.01); *Y04S 20/30* (2013.01)

(58) Field of Classification Search
CPC ... G05D 7/0635; G01F 15/005; G01F 15/063; G01F 25/10; G01M 3/2815; G01D 4/00; G01D 18/00; G01D 2204/26; G01D 2218/10; Y02B 90/20; Y04S 20/30
USPC .......................................................... 137/12
See application file for complete search history.

(56) References Cited

U.S. PATENT DOCUMENTS

| | | | | |
|---|---|---|---|---|
| 2002/0082748 A1* | 6/2002 | Enga | ...................... | G01D 4/004 700/286 |
| 2004/0216514 A1* | 11/2004 | Nunnally | ............ | G01M 3/2815 73/40 |

(Continued)

*Primary Examiner* — Minh Q Le
(74) *Attorney, Agent, or Firm* — Stanek Lemon Crouse Meeks, PA

(57) ABSTRACT

Methods of determining if it is safe to restore service to a gas meter remotely are provided. The method includes determining if any pre-existing conditions are present in the gas meter responsive to issuance of a restore command to restore service from a remote location. The pre-existing conditions indicates that safety test results are unreliable. If it is determined that no pre-existing conditions are present, a valve on the gas meter is opened to fill the gas meter with gas until the gas meter reaches a predefined fill state. It is determined if pressure in the gas meter is stable at the predefined fill state and the valve on the gas meter is closed if the pressure is stabilized. A pressure decay test is performed after the valve on the gas meter is closed. The valve to restore gas flow is opened if the pressure decay test passes.

20 Claims, 5 Drawing Sheets

(51) Int. Cl.
*G01D 18/00* (2006.01)
*G01F 25/10* (2022.01)

(56) References Cited

U.S. PATENT DOCUMENTS

| | | | | |
|---|---|---|---|---|
| 2011/0074600 A1* | 3/2011 | Cornwall | ............... | G01D 4/004 340/870.02 |
| 2011/0074601 A1* | 3/2011 | Cornwall | ............... | G01D 4/004 340/870.02 |
| 2011/0074602 A1* | 3/2011 | Cornwall | ............... | G01D 4/004 340/870.02 |
| 2012/0056711 A1* | 3/2012 | Hanrahan | ............... | G05B 9/02 340/3.4 |
| 2012/0326883 A1* | 12/2012 | Angelis | ............... | H04Q 9/00 705/412 |
| 2013/0304264 A1* | 11/2013 | Shao | ............... | G07F 15/001 700/282 |
| 2014/0129272 A1* | 5/2014 | Hanley | ............... | G06Q 50/06 705/7.13 |
| 2016/0025536 A1* | 1/2016 | Madsen | ............... | G06F 17/18 702/45 |
| 2016/0290829 A1* | 10/2016 | Wada | ............... | G01D 4/002 |
| 2016/0320763 A1* | 11/2016 | Jorgensen | ............... | G08C 23/04 |
| 2019/0271583 A1* | 9/2019 | Malinowski | ............... | G01F 15/066 |
| 2020/0144823 A1* | 5/2020 | Radhakrishnan | ............... | G05B 15/02 |
| 2020/0340828 A1* | 10/2020 | Bui | ............... | H04Q 9/02 |
| 2021/0054997 A1* | 2/2021 | Sakata | ............... | G01F 15/005 |
| 2021/0271270 A1* | 9/2021 | Bafaro | ............... | F17D 5/02 |
| 2021/0334913 A1* | 10/2021 | Klein | ............... | G01F 15/06 |
| 2021/0396359 A1* | 12/2021 | Thakkar | ............... | F16K 17/205 |
| 2022/0004902 A1* | 1/2022 | Alhelo | ............... | G06Q 10/20 |
| 2022/0101273 A1* | 3/2022 | Chatteron | ............... | G06Q 10/063114 |
| 2023/0088246 A1* | 3/2023 | Thompson | ............... | G06Q 50/06 705/305 |
| 2023/0332938 A1* | 10/2023 | Shao | ............... | G01F 15/046 |

\* cited by examiner

METHODS FOR SAFELY RESTORING GAS FLOW TO A BUILDING FROM A REMOTE LOCATION AND RELATED SMART METERS

CROSS-REFERENCE TO RELATED APPLICATION

This application claims priority to U.S. Provisional Application Ser. No. 63/120,371, filed Dec. 2, 2020, entitled Methods, Systems and Computer Program Products for Safely Restoring Gas Flow to a Building from a Remote Location, the content of which is hereby incorporated herein by reference in its entirety.

FIELD

The present inventive concept relates generally to meters and, more particularly, to turning gas meters on and off at a building.

BACKGROUND

North American gas utilities currently follow antiquated processes for restoring gas service to customers. Generally, North America gas utilities send out a service technician in a truck every time gas flow needs to be restored to a building. There may be a number of reasons service needs to be turned on or restored. For example, utilities turn gas flow on/off at the meter after a natural disaster, when a customer moves in or moves move out, when a customer does not pay and the like. In the event of a natural disaster or event that causes a vast amount of customers to lose gas flow at the same time, it could take days or even weeks to restore service to all customers. Restoring service, regardless of being on a large scale or small scale, costs the utility money and can be an inefficient process if permission is needed to enter a home, as some meters reside inside a customer's home. Furthermore, due to circumstances surrounding the recent pandemic, technicians are reluctant to enter customers' homes.

North American utilities continue to restore gas service physically at the meter for a number of reasons. For example, currently there is no remote actuated valve at the residence. Furthermore, it is difficult to perform all safety checks remotely, so for safety purposes and ensuring that all safety checks are completed, presence at the physical meter is required. Accordingly, remote capabilities are desired.

SUMMARY

Some embodiments of the present inventive concept provide methods of determining if it is safe to restore service to a gas meter remotely. The method includes determining if any pre-existing conditions are present in the gas meter responsive to issuance of a restore command to restore service from a remote location, the pre-existing conditions indicating that safety test results are unreliable; if it is determined that no pre-existing conditions are present, opening a valve on the gas meter to fill the gas meter with gas until gas in the gas meter reaches a predefined fill state; determining if pressure in the gas meter is stable at the predefined fill state; closing the valve on the gas meter if it is determined that the pressure is stabilized; performing a pressure decay test after the valve on the gas meter is closed; and opening the valve to restore gas flow in the gas meter if the pressure decay test passes. At least one of the steps is performed by at least one processor.

In further embodiments, performing the pressure decay test may include fast sampling of pressure data over a predefined time interval; calculating pressure difference from a start of the pressure decay test to an end of the pressure decay test; and determining if the pressure decay test passes based on the calculated pressure difference.

In still further embodiments, determining if the pressure decay test passed may include if the calculated pressure difference of the pressure decay test is within a predefined range the pressure decay test passes; and if the calculated pressure difference of the pressure decay test is outside the predefined range the pressure decay test fails and the valve remains closed.

In some embodiments, a result of the pressure decay test may be communicated with a remote location. The method may further include sounding an alarm if the pressure decay test fails.

In further embodiments, determining if pressure in the gas meter is stable at the predefined fill state may include repeating determining if the pressure in the gas meter is stable at the predefined fill state at least one time if it is first determined that the gas meter is unstable.

In still further embodiments, if it is determined that pre-existing conditions are present, the method may further include failing request to restore service responsive to the restore command from the remote location and sounding an alarm to indicate failure of the restore command.

In some embodiments, the remote location may include at least one of a remote physical location and a remote device.

In further embodiments, a pre-existing condition may be determined to be present when a hardware or metrology alarm is activated indicating that calibration of sensors or metrology are suspect.

In still further embodiments, the sensor may be one or more of a pressure sensor, a temperature sensor, a vibration sensor and a methane sensor.

Some embodiments of the present inventive concept provide a method of determining if it is safe to restore service to a gas meter remotely. The method includes determining if any pre-existing conditions are present in the gas meter responsive to issuance of a restore command to restore service from a remote location, the pre-existing conditions indicating that safety test results are unreliable; if it is determined that no pre-existing conditions are present, opening a valve on the gas meter to fill the gas meter with gas until gas in the gas meter reaches a predefined fill state; determining if pressure in the gas meter is stable at the predefined fill state; performing a leak test if it is determined that the pressure in the gas meter is stable at the predefined fill state; and allowing the valve to remain open if the leak test passes. At least one of the steps is performed by at least one processor.

In further embodiments, performing the leak test may include fast sampling of flow rate data over a predefined time interval; analyzing the flow rate from a start of the leak test to an end of the leak test; and determining if the flow rate during the leak test passes based on the analyzed flow rates.

In still further embodiments, determining if the leak test passed may include if the analyzed flow rate of the leak test is within a predefined threshold the leak test passes; and if the analyzed flow rate of the leak test is not within a predefined threshold the leak test fails and the valve is closed.

In some embodiments, a result of the leak test may be communicated with a remote location and an alarm may be sounded if the leak test fails.

In further embodiments, determining if pressure in the gas meter is stable at the predefined fill state may include repeating determining if the pressure in the gas meter is stable at the predefined fill state at least one time if it is first determined that the gas meter is unstable.

In still further embodiments, if it is determined that pre-existing conditions are present, the method may further include failing the request to restore service responsive to the restore command from the remote location and sounding an alarm to indicate failure of the restore command.

In further embodiments, allowing the valve to remain open if the leak test passes may be followed by closing the valve on the gas meter if the leak test passes; performing a pressure decay test after the valve on the gas meter is closed; and opening the valve to restore gas flow in the gas meter if the pressure decay test passes.

In some embodiments of the present inventive concept, performing the pressure decay test may include fast sampling of pressure data over a predefined time interval; calculating pressure difference from a start of the pressure decay test to an end of the pressure decay test; and determining if the pressure decay test passes based on the calculated pressure difference.

In further embodiments of the present inventive concept, determining if the pressure decay test passed may include if the calculated pressure difference of the pressure decay test is within a predefined range the pressure decay test passes; and if the calculated pressure difference of the pressure decay test is outside the predefined range the pressure decay test fails and the valve remains closed.

Still further embodiments of the present inventive concept provide smart gas meter that has service safely restored from a remote location. The smart gas meter includes a safety protocols module that determines if any pre-existing conditions are present in the smart gas meter responsive to issuance of a restore command to restore service from a remote location, the pre-existing conditions indicating that safety test results are unreliable; and a remote on/off valve module that, if it is determined that no pre-existing conditions are present, opens a valve on the gas meter to fill the gas meter with gas until gas in the gas meter reaches a predefined fill state. The safety protocols module further determines if pressure in the gas meter is stable at the predefined fill state, performs a leak test if it is determined that the pressure in the gas meter is stable at the predefined fill state allows the valve to remain open if the leak test passes.

In some embodiments, the safety protocols module may further close the valve on the gas meter if the leak test passes and performs a pressure decay test after the valve on the gas meter is closed. The remote on/off valve module may open the valve to restore gas flow in the gas meter if the pressure decay test passes.

DETAILED DESCRIPTION

Figure 1:
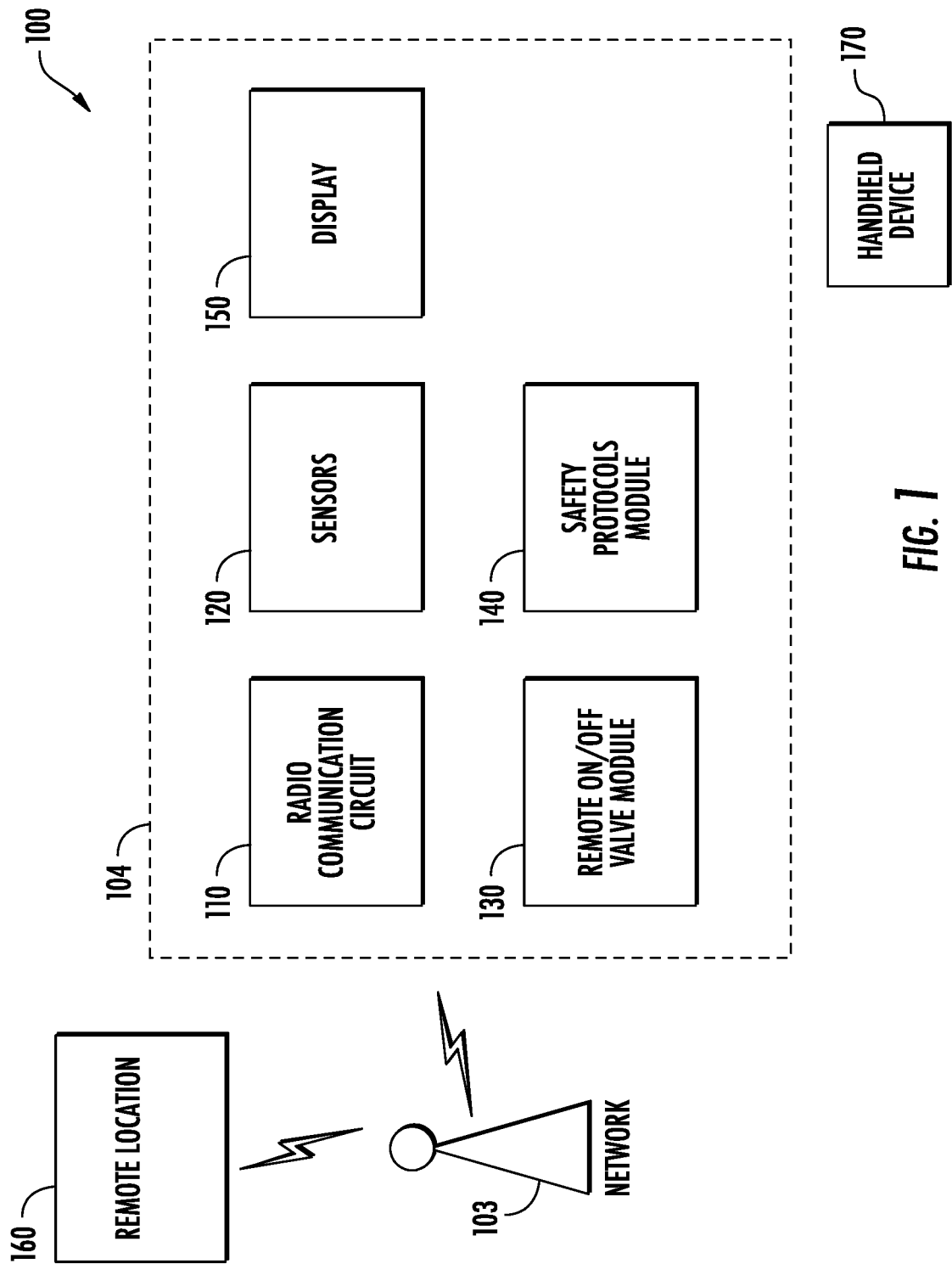
FIG. 1 is a block diagram illustrating a high level block diagram of a smart meter in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As used herein, "safety test" refers to any test performed to determine if it is safe to turn on a meter remotely. Specific test, such as leak tests and pressure decay tests, are discussed herein, however, embodiments of the present inventive concept are not limited to these examples.

As discussed above, North America gas utility companies generally still send technicians to the location of the gas meter to physically restore service thereto. Until now, there was many reasons why a technician physically present at the meter was necessary. However, with the introduction of new meters, for example, Sonix IQ offered by Xylem, to the market, utilities in North America may now have the ability to remotely actuate a valve that is built into a residential gas meter. These meters may also have built in sensors, such as temperature, pressure, vibration etc., that will allow safety procedures to be performed remotely. These "smart meters" are equipped with radio communication capabilities that allow the meter to communicate with remote devices. Accordingly, some embodiments of the present inventive concept provide methods for using the combination of these new capabilities in the meter, along with over the air communications and onsite handheld tools, to enable a utility to restore service to a customer. Embodiments of the present inventive concept provide a method that performs required safety checks prior to fully restoring gas flow to allow remote turn on of the gas flow as will be discussed further herein.

With the advent of new gas meter technology, embodiments of the present inventive concept provide firmware/methods for smart gas meters so that all required safety checks can be completed using firmware algorithms in order to remotely restore service to customers. As discussed further herein, using firmware algorithms that check pre-existing conditions and then either monitor flow, pressure decay, or a combination of pressure and flow can enable a utility to remotely restore service to a customer or even restore service onsite if they so desire using smart technology.

Referring first to FIG. 1, a basic block diagram of the relevant portions of a smart meter, for example, a SONIX IQ meter offered by Xylem, will be discussed. It will be understood that although embodiments of the present inventive concept discuss a SONIX IQ meter, embodiments of the present inventive concept are not limited thereto. For example, any meter that is capable of implementing methods discussed herein may be used without departing from the scope of the present inventive concept. Furthermore, the block diagram of FIG. 1 is provided as an example only, more components are actually included in the meter itself. Furthermore, modules of FIG. 1 may be combined or broken into two or more modules without departing from the scope of the present inventive concept.

As illustrated in FIG. 1, a meter 100 includes a radio communication circuit 110, one or more sensors 120, a remote on/off valve module 130, a safety protocols module 140 and a display 150. All of the circuits, modules and sensors are provided in a housing 104 associated with the meter 100. The display 150 may be provided on the housing 104 to provide information to the technician, building owner or resident. In some embodiments, the display 150 may be a liquid crystal display (LCD), but embodiments of the present inventive concept are not limited thereto. The radio communication module 110 communicates with the network 104, which then allows the meter 100 to communicate with a remote location 160. Thus, embodiments of the present inventive concept may provide gas flow instructions to the meter 100 from the remote location using the radio communication circuit 110.

Although embodiments of the present inventive concept only illustrate a single remote location, embodiments of the present inventive concept are not limited thereto. More than one remote location may be provided without departing from the scope of the present inventive concept. Furthermore, communication with the remote locate from the network 103 may be via any communication method known to those of skill in the art.

Meters provided by Xylem communicate using FLEXNET, a radio network 103 that operates in licensed spectrum in the 900 MHz range, with the uplink utilizing 901 to 902 MHz and the downlink utilizing 940 to 941 MHz. These spectrum allocations are subdivided into multiple narrowband channels, for example, 25 KHz channels. Individual narrowband channels can be allocated to respective control modules, or a set of control modules can be assigned to operate on one or more such channels, while other groups are assigned to other channels. Data is sent on a per-channel basis using Frequency Shift Keying ("FSK"), for example, 4, 8, or 16FSK, where the data may be "packaged" in messages of a predefined bit length. Although some embodiments may use the FLEXNET as the radio communication network, embodiments of the present inventive concept are not limited thereto. Any radio network may be used without departing from the scope of the present inventive concept, for example, a Zigbee protocol/network may be used in some embodiments.

As discussed above, the meter 100 may include one or more sensors 120 that may indicate the status of the meter, gas flow and the like, i.e. is the meter safe to turn on. The sensors 120 may include, for example, a pressure sensor, a temperature sensor, a vibration sensor, a methane sensor and the like. The methods in accordance with embodiments discussed herein may use the information provided by these sensors to implement the safety protocols necessary before starting the flow of gas from a remote location.

The remote on/off module 130 may provide instructions to the remote on/off valve associated with the meter once the determination that it is safe to turn on the meter 100 has been made. The safety protocols module 140 is configured to implement methods in accordance with embodiments discussed herein for determining if all safety protocols are completed before the meter can be safely turned on from a remote location as will be discussed further below.

As discussed above, in some embodiments, instructions may be received from a remote location 160, however, embodiment are not limited thereto. In some embodiments, instructions may be received from a handheld device 170 that may or may not be onsite.

Embodiments of the present inventive concept discuss various different methods for restoring service to a building remotely in a safe way. Each of the methods will be discussed below with respect to the flowcharts of FIGS. 2 through 4.

Figure 2:
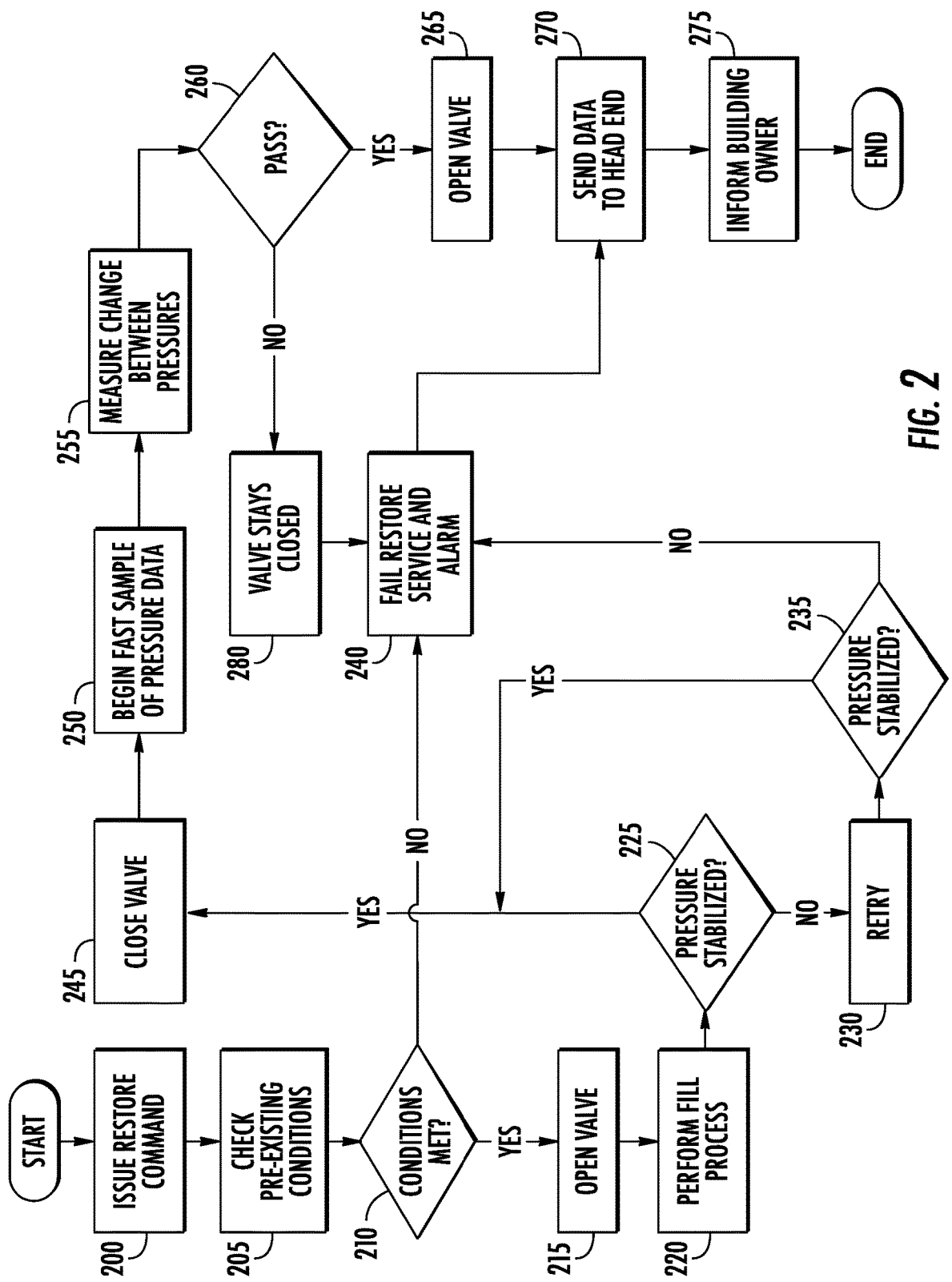
FIGS. 2-4 are flowcharts illustrating operations for safely restoring gas flow from a remote location in accordance with various embodiments of the present inventive concept.

Referring first to the flowchart of FIG. 2, methods of monitoring pressure decay to determine safety in accordance with embodiments of the present inventive concept will be discussed. The flowchart of FIG. 2 illustrates restoring service remotely to a gas meter using a pressure decay test. As illustrated in FIG. 2, operations begin at block 200 by issuing a restore command. Once the restore command is issued, for example, from a remote location (or onsite via a handheld device) using the radio communications circuit 110, it is determined if there are any pre-existing conditions with the gas meter that would cause results of the pressure decay test to be unreliable (block 205). In embodiments using the Sonix IQ meter, the Sonix IQ gas meter has built in alarms that may reduce the likelihood, or possibly prevent, the meter from ever even starting the pressure decay test if the meter knew results would be unreliable. It is determined if the per-existing conditions are met (block 210). For example, there may be hardware or metrology alarms that could bring the calibration of the sensors or metrology into question. For example, a tamper alarm may sound if a resident has tampered with the meter. In some embodiments, the sensor may include, for example, a pressure sensor, a temperature sensor, a vibration sensor, a methane sensor and the like.

If it is determined that the pre-existing conditions have not been met (block 210) operations proceed to block 240 where the remote request to restore service fails and an alarm may be sounded (block 240).

If, on the other hand, the pre-existing conditions are determined to be met (block 210), operations proceed to block 215 where the valve on the meter is opened to allow the meter to fill with gas (block 220). After the meter has reached a predefined fill state, it is determined if the pressure in the meter is stabilized (block 225). As discussed above, the meter may include a pressure sensor (as well as other sensors) which may be used to determine if the pressure in the meter has stabilized. If it is determined that pressure is not stabilized (block 225), the pressure test may be performed again (block 230) and it is again determined if the pressure has stabilized (block 235). If, on the second try (block 235), it is still determined that the pressure is not stabilized, operations proceed to block 240 where the restore effort fails and an alarm may be sounded.

If, on the other hand, if the pressure is determined to be stabilized at blocks 225 or 235, operations proceed to block 245 where the valve of the meter is closed. Once the valve is closed (block 245) the pressure decay test begins. As illustrated, the meter will begin a fast sample mode where pressure readings are taken over a predefined time interval (block 250). It will be understood that this time interval may be customized to the particular use case. For example, in some embodiments, the time interval may be from about 30 seconds to twenty minutes. However, embodiments are not limited to this time frame. After that time interval is complete the pressure delta from start to finish will be calculated. A difference between a starting pressure measurement and an ending pressure measurement during the time period is calculated (block 255). It is determined if the pressure difference (delta) exceeds a predefined threshold or is outside a predefines range (block 260). If the pressure difference exceeds the threshold (block 260), operations proceed to block 280 and the valve of the meter remains closed. Operations proceed to block 240 where the test is deemed failed and an alarm may sound. As illustrated, the failed test (block 240) may be communicated over to the operator (block 270), for example, over the air. The test failure may be communicated to the building owner or resident (block 275). For example, the failure may be communicated by an liquid crystal display (LCD) on the meter. However, embodiments of the present inventive concept are not limited to this configuration.

It will be understood that pressure limits vary by meter and, therefore, there is no specific threshold for every embodiment. Each situation will have its own particular limits.

If, on the other hand, the pressure difference is calculated to be in an acceptable range (block 260), operations proceed to block 265 where the valve is opened, and gas flow is remotely restored to the building safely and successfully. The details of the passed test are sent to the head end (block 270) and reported to the owner or resident of the building (block 275).

Figure 3:
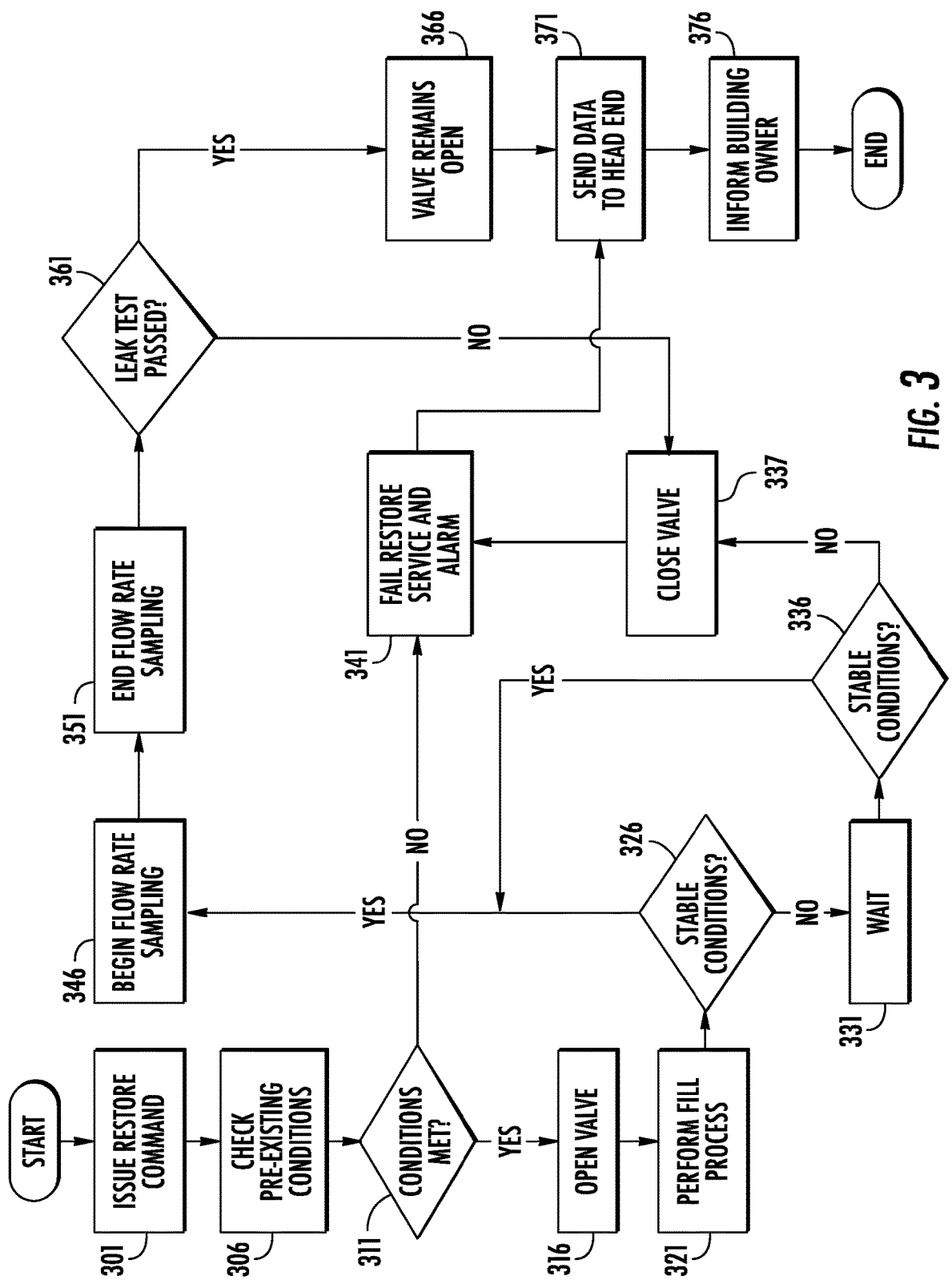

Referring now to FIG. 3, operations for safely restoring gas flow from a remote location by monitoring flow through the meter will be discussed. As illustrated in FIG. 3, operations begin at block 301 by issuing a restore command. Once the restore command is issued, for example, from a remote location using the radio communications circuit 110, it is determined if there are any pre-existing conditions with the gas meter that would cause results of the flow test to be unreliable (block 306). In embodiments using the Sonix IQ meter, the Sonix IQ gas meter has built in alarms that may reduce the likelihood, or possibly prevent, the meter from ever even starting a test if the meter knew results would be unreliable. It is determined if the pre-existing conditions are met (block 311).

If it is determined that the pre-existing conditions have not been met (block 311) operations proceed to block 341 where the remote request to restore service fails and an alarm may be sounded (block 341).

If, on the other hand, the pre-existing conditions are determined to be met (block 311), operations proceed to block 316 where the valve on the meter is opened to allow the meter to fill with gas (block 321). After the meter has reached a predefined fill state, it is determined if conditions in the meter are stable (block 326). As discussed above, the meter may include a pressure sensor (as well as other sensors) which may be used to determine if the conditions in the meter are stabilized. If it is determined that the conditions are not stable (block 326), the method waits (block 331) and performs the test again (block 336). If, on the second try (block 336), it is still determined that the conditions are not stable, operations proceed to block 337 where the valve of the meter is closed. Once the valve is closed (block 337) and the remote restore fails and an alarm may be sounded (block 341).

If, on the other hand, the conditions are determined to be stable at blocks 326 or 336, operations proceed to block 346 where the meter will begin a fast sample mode where a flow rate may be sampled over a predetermined period of time. After that time interval is complete (block 351), the flow rate is analyzed to determine if the leak test passed (block 361). In other words, at block 361, it is determined if the flow rate exceeds a predefined threshold.

If the flow rate is determined to exceed the threshold (block 361), operations proceed to block 337 where the valve is closed. Operations proceed to block 341 where the test is deemed failed and an alarm may sound. As illustrated, the failed test (block 341) may be communicated over to the operator (block 371), for example, over the air. The test failure may be communicated to the building owner or resident (block 376). For example, the failure may be communicated by a liquid crystal display (LCD) on the meter. However, embodiments of the present inventive concept are not limited to this configuration.

If, on the other hand, the flow rate is determined not to exceed an acceptable threshold (block 361), operations proceed to block 366 where the valve is allowed to remain open and gas flow is remotely restored to the building safely and successfully. The details of the passed test are sent to the head end (block 371) and reported to the owner or resident of the building (block 376).

Figure 4:
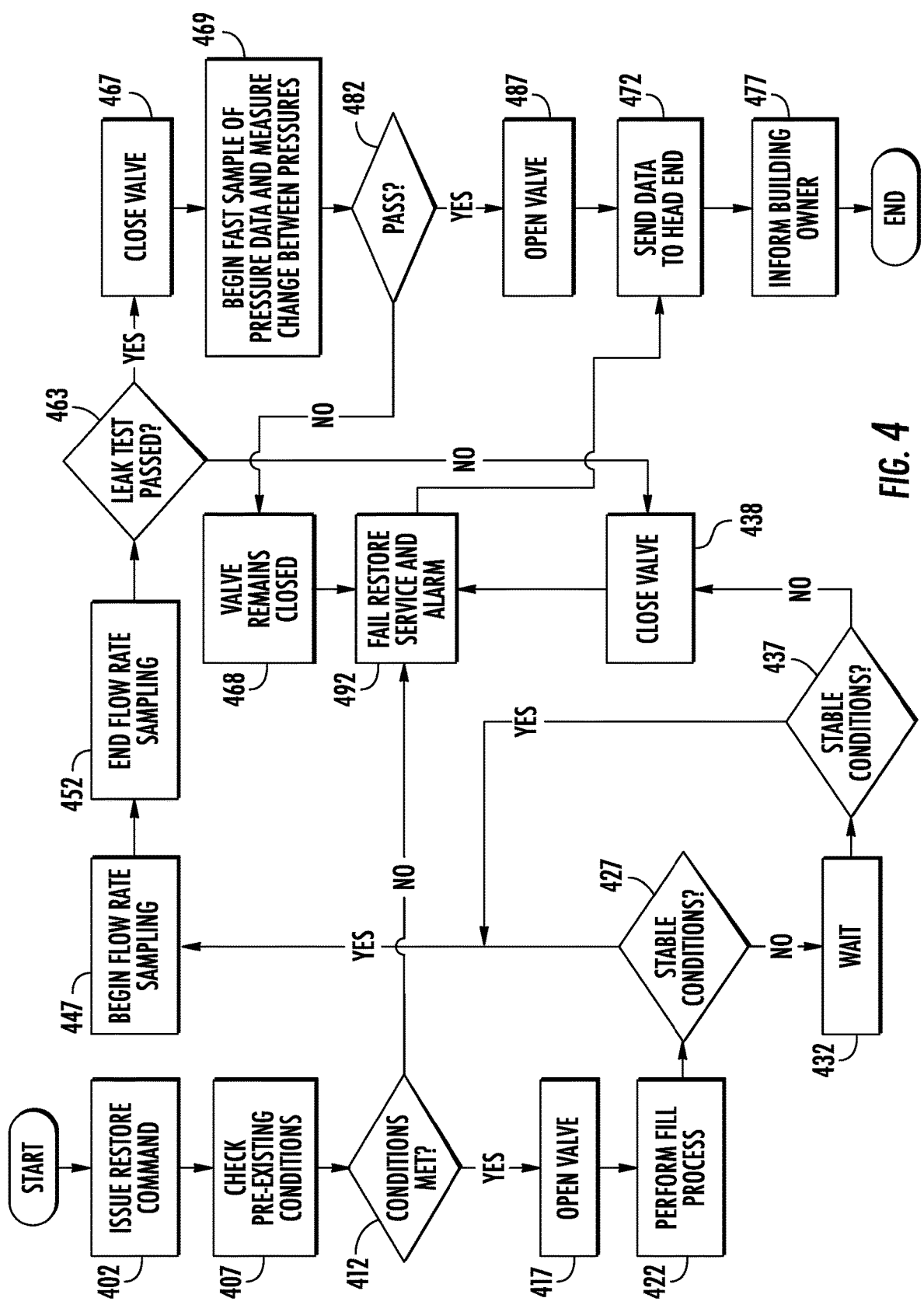

Referring now to FIG. 4, a flowchart illustrating methods for safely restoring gas flow from a remote location using a combination of the pressure and flow methods discussed above will now be discussed. In other words, the method illustrated in the flowchart of FIG. 4 combines aspects of the methods illustrated in FIGS. 2 and 3 discussed above. This method may provide a more redundant and, therefore, possibly a safer solution.

Operations begin at block 402 by issuing a restore command. Once the restore command is issued, for example, from a remote location using the radio communications circuit 110, it is determined if there are any pre-existing conditions with the gas meter that would cause results of the pressure decay test to be unreliable (block 407). In embodiments using the Sonix IQ meter, the Sonix IQ gas meter has built in alarms that may reduce the likelihood, or possibly prevent, the meter from ever even starting the pressure decay test if the meter knew results would be unreliable. It is determined if the pre-existing conditions are met (block 412).

If it is determined that the pre-existing conditions have not been met (block 412) operations proceed to block 492 where the remote request to restore service fails and an alarm may be sounded (block 492).

If, on the other hand, the pre-existing conditions are determined to be met (block 412), operations proceed to block 417 where the valve on the meter is opened to allow the meter to fill with gas (block 422). After the meter has reached a predefined fill state, it is determined if the meter is experiencing stabilized conditions (block 427). As discussed above, the meter may include a pressure sensor (as well as other sensors) which may be used to determine if the conditions in the meter are stabilized. If it is determined that the conditions are not stable (block 427), the method waits (block 432) and performs the test again (block 437). If, on the second try (block 437), it is still determined that the conditions are not stable, operations proceed to block 438 where the valve of the meter is closed. Once the valve is closed (block 438), the remote restore fails and an alarm may be sounded (block 492). It will be understood that although embodiments of the present inventive concept are discussed herein only evaluating the conditions of the meter twice at blocks 427 and 437, embodiments of the present inventive concept are not limited thereto. More than two checks may be performed without departing from the scope of the present inventive concept.

Although the flowchart of FIG. 4 illustrates that the leak test is performed before the pressure test, embodiments of the present inventive concept are not limited to this configuration. For example, the pressure test could be performed first followed by the leak test without departing from the scope of the present inventive concept.

If, on the other hand, the conditions are determined to be stable at blocks 427 or 437, operations proceed to block 447 where the meter will begin a fast sample mode where a flow rate may be sampled over a predetermined period of time. After that time interval is complete (block 452), the flow rate is analyzed to determine if the leak test passed (block 463). In other words, at block 463, it is determined if the flow rate exceeds a predefined threshold.

If the flow rate is determined to exceed the threshold (block 463), operations proceed to block 438 where the valve is closed. Operations proceed to block 492 where the test is deemed failed and an alarm may sound. As illustrated, the failed test (block 492) may be communicated over to the operator (block 472), for example, over the air. The test failure may be communicated to the building owner or resident (block 477). For example, the failure may be communicated by an liquid crystal display (LCD) on the meter. However, embodiments of the present inventive concept are not limited to this configuration.

If, on the other hand, the flow rate is determined not to exceed an acceptable threshold (block 463), operations proceed to block 467 where the valve is closed. The meter will begin a fast sample mode where pressure readings are taken over a predefined time interval and a pressure delta from start to finish will be calculated (block 469). In other words, a difference between a starting pressure measurement and an ending pressure measurement during the time period is calculated (block 469). It is determined if the pressure difference (delta) exceeds a predefined threshold (block 482). If the pressure difference exceeds the threshold (block 482), operations proceed to block 468 and the valve of the meter remains closed. Operations proceed to block 492 where the test is deemed failed and an alarm may sound. As illustrated, the failed test (block 492) may be communicated over to the operator (block 472), for example, over the air. The test failure may be communicated to the building owner or resident (block 477). For example, the failure may be communicated by an liquid crystal display (LCD) on the meter. However, embodiments of the present inventive concept are not limited to this configuration.

If, on the other hand, it is determined that the pressure difference (delta) does not exceed a predefined threshold (block 482), operations proceed to block 487 where the valve is opened and gas flow is remotely restored to the building safely and successfully. The details of the passed test are sent to the head end (block 472) and reported to the owner or resident of the building (block 477).

Various methods for safely restoring gas flow from a remote location have been discussed above with respect to the flowcharts of FIGS. 2-4. It is noted that for embodiments discussed herein algorithms may be stored and performed within the meter itself or external to the meter without departing from the scope of the present inventive concept. The tests could be performed while a technician is onsite, or they could be done remotely over the air by simply clicking a button in the user interface of a software application. Once the button is clicked either on site or remotely, embodiments of the present inventive concept provide a feedback loop that tracks the workflow of the restore service command in a software application. In the event of a failure, a notification may be sent to the customer and the operator notifying the customer to check their appliances and make sure they are all turned off. In the event that gas flow is restored successfully, a notification may be sent to the customer notifying them of restoration and, for example, reminding them that they may need to relight their pilot lights.

Figure 5:
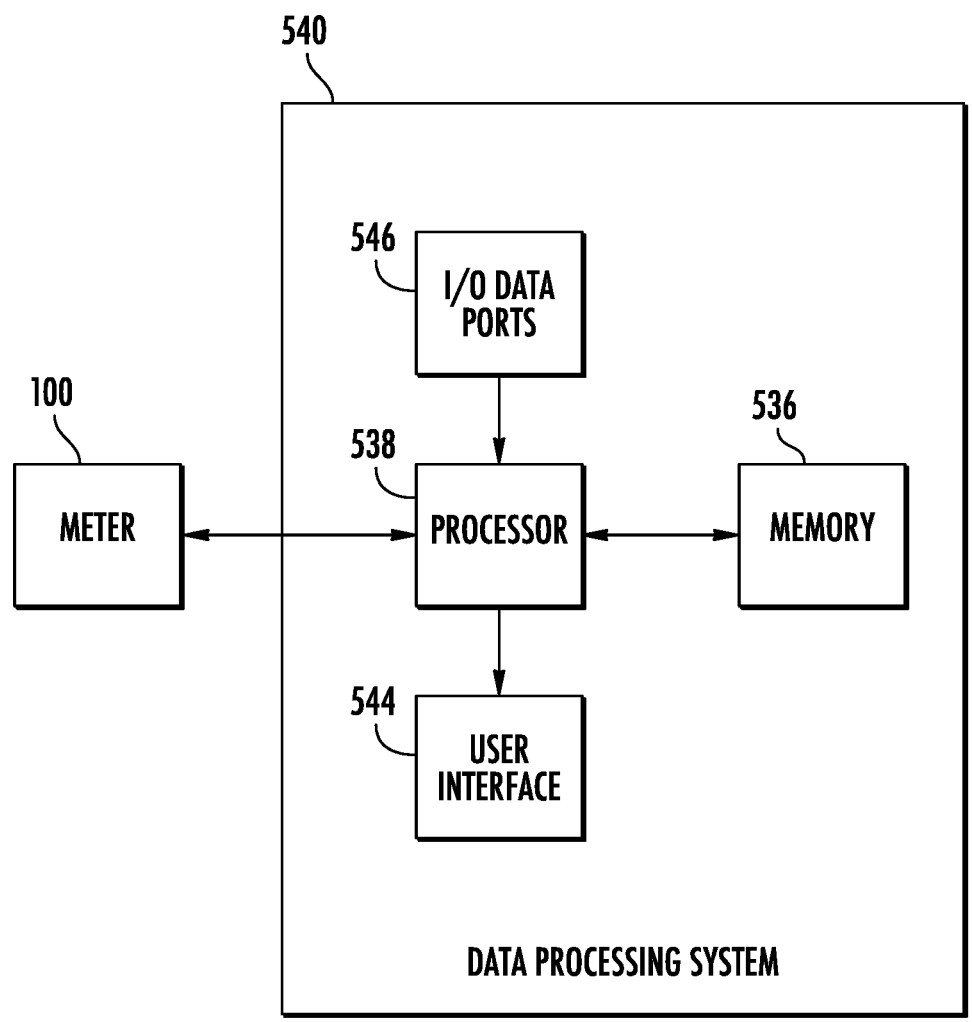
FIG. 5 is a block diagram of a data processing system in accordance with some embodiments of the present inventive concept.

As is clear from the embodiments discussed above, some aspects of the present inventive concept may be implemented by a data processing system in communication with the meter 100. The data processing system may be included at any module of the system without departing from the scope of the preset inventive concept. Exemplary embodiments of a data processing system 540 configured in accordance with embodiments of the present inventive concept will be discussed with respect to FIG. 5. The data processing system 540 may include a user interface 544, including, for example, input device(s) such as a keyboard or keypad, a display, a speaker and/or microphone, and a memory 536 that communicate with a processor 538. The data processing system 530 may further include I/O data port(s) 546 that also communicates with the processor 538. The I/O data ports 546 can be used to transfer information between the data processing system 540 and another computer system or a network using, for example, an Internet Protocol (IP) connection. These components may be conventional components such as those used in many conventional data processing systems, which may be configured to operate as described herein.

It will be understood that meters in countries beyond North America, for example, Europe, have implemented remote restoration of service. European utilities are able to remotely restore service without rolling a truck based on European standard BS EN-16314:2013. Some embodiments of the present inventive concept reflect this European Standard As briefly discussed above, some embodiments of the present inventive concept provide methods for remotely storing gas flow to a residence or business safely. Three methods are discussed herein, a pressure decay method, a monitoring flow method and a combination of the two. Because modern meters, for example, SONIX IQ have the ability to remotely actuate a valve that is built into gas meters, which have built in pressure sensors, and the ability to communicate over the air, embodiments of the present inventive concept can provide firmware algorithms that performs required safety checks prior to fully restoring gas flow.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk or C++. However, the computer program code for carrying out operations of the present inventive concept may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part above with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the specification, there have been disclosed embodiments of the inventive concept and, although specific terms are used, they are used in a generic and descriptive sense only and not for purposes of limitation. The following claims is provided to ensure that the present application meets all statutory requirements as a priority application in all jurisdictions and shall be construed as setting forth the scope of the present inventive concept.

What is claimed is:

1. A method of determining if it is safe to restore service to a gas meter remotely, the method comprising:
    determining if any pre-existing conditions are present in the gas meter responsive to issuance of a restore command to restore service from a remote location, the pre-existing conditions indicating that safety test results are unreliable;
    if it is determined that no pre-existing conditions are present, opening a valve on the gas meter to fill the gas meter with gas until gas in the gas meter reaches a predefined fill state;
    determining if pressure in the gas meter is stable at the predefined fill state;
    closing the valve on the gas meter if it is determined that the pressure is stabilized;
    performing a pressure decay test after the valve on the gas meter is closed; and
    opening the valve to restore gas flow in the gas meter if the pressure decay test passes,
    wherein at least one of the determining, opening, determining, closing, performing and opening are performed by at least one processor.

2. The method of claim 1, wherein performing the pressure decay test comprises:
    fast sampling of pressure data over a predefined time interval;
    calculating pressure difference from a start of the pressure decay test to an end of the pressure decay test; and
    determining if the pressure decay test passes based on the calculated pressure difference.

3. The method of claim 1, wherein determining if the pressure decay test passed comprises:
    if the calculated pressure difference of the pressure decay test is within a predefined range the pressure decay test passes; and
    if the calculated pressure difference of the pressure decay test is outside the predefined range the pressure decay test fails and the valve remains closed.

4. The method of claim 3, wherein a result of the pressure decay test is communicated with a remote location, the method further comprising sounding an alarm if the pressure decay test fails.

5. The method of claim 1, wherein determining if pressure in the gas meter is stable at the predefined fill state comprises repeating determining if the pressure in the gas meter is stable at the predefined fill state at least one time if it is first determined that the gas meter is unstable.

6. The method of claim 1, wherein if it is determined that pre-existing conditions are present, the method further comprises failing the request to restore service responsive to the restore command from the remote location and sounding an alarm to indicate failure of the restore command.

7. The method of claim 6, wherein the remote location includes at least one of a remote physical location and a remote device.

8. The method of claim 1, wherein a pre-existing condition is determined to be present when a hardware or metrology alarm is activated indicating that calibration of sensors or metrology are suspect.

9. The method of claim 1, wherein sensors comprise one or more of a pressure sensor, a temperature sensor, a vibration sensor and a methane sensor.

10. A method of determining if it is safe to restore service to a gas meter remotely, the method comprising:
   determining if any pre-existing conditions are present in the gas meter responsive to issuance of a restore command to restore service from a remote location, the pre-existing conditions indicating that safety test results are unreliable;
   if it is determined that no pre-existing conditions are present, opening a valve on the gas meter to fill the gas meter with gas until gas in the gas meter reaches a predefined fill state;
   determining if pressure in the gas meter is stable at the predefined fill state;
   performing a leak test if it is determined that the pressure in the gas meter is stable at the predefined fill state; and
   allowing the valve to remain open if the leak test passes,
   wherein at least one of the determining, opening, determining, performing and allowing are performed by at least one processor.

11. The method of claim 10, wherein performing the leak test comprises:
   fast sampling of flow rate data over a predefined time interval;
   analyzing the flow rate from a start of the leak test to an end of the leak test; and
   determining if the flow rate during the leak test passes based on the analyzed flow rates.

12. The method of claim 10, wherein determining if the leak test passed comprises:
   if the analyzed flow rate of the leak test is within a predefined threshold the leak test passes; and
   if the analyzed flow rate of the leak test is not within a predefined threshold the leak test fails and the valve is closed.

13. The method of claim 12, wherein a result of the leak test is communicated with a remote location, the method further comprising sounding an alarm if the leak test fails.

14. The method of claim 10, wherein determining if pressure in the gas meter is stable at the predefined fill state comprises repeating determining if the pressure in the gas meter is stable at the predefined fill state at least one time if it is first determined that the gas meter is unstable.

15. The method of claim 10, wherein if it is determined that pre-existing conditions are present, the method further comprises failing request to restore service responsive to the restore command from the remote location and sounding an alarm to indicate failure of the restore command.

16. The method of claim 1, allowing the valve to remain open if the leak test passes is followed by:
   closing the valve on the gas meter if the leak test passes;
   performing a pressure decay test after the valve on the gas meter is closed; and
   opening the valve to restore gas flow in the gas meter if the pressure decay test passes.

17. The method of claim 16, wherein performing the pressure decay test comprises:
   fast sampling of pressure data over a predefined time interval;
   calculating pressure difference from a start of the pressure decay test to an end of the pressure decay test; and
   determining if the pressure decay test passes based on the calculated pressure difference.

18. The method of claim 16, wherein determining if the pressure decay test passed comprises:
   if the calculated pressure difference of the pressure decay test is within a predefined range the pressure decay test passes; and
   if the calculated pressure difference of the pressure decay test is outside the predefined range the pressure decay test fails and the valve remains closed.

19. A smart gas meter that has service safely restored from a remote location, the smart gas meter comprising:
   a safety protocols module that determines if any pre-existing conditions are present in the smart gas meter responsive to issuance of a restore command to restore service from a remote location, the pre-existing conditions indicating that safety test results are unreliable;
   a remote on/off valve module that, if it is determined that no pre-existing conditions are present, opens a valve on the gas meter to fill the gas meter with gas until gas in the gas meter reaches a predefined fill state;
   wherein the safety protocols module further determines if pressure in the gas meter is stable at the predefined fill state, performs a leak test if it is determined that the pressure in the gas meter is stable at the predefined fill state allows the valve to remain open if the leak test passes.

20. The smart gas meter of claim 19:
   wherein the safety protocols module further closes the valve on the gas meter if the leak test passes and performs a pressure decay test after the valve on the gas meter is closed; and
   wherein the remote on/off valve module opens the valve to restore gas flow in the gas meter if the pressure decay test passes.

* * * * *